United States Patent [19]
Lowe

[11] 3,824,660
[45] July 23, 1974

[54] METHOD AND APPARATUS FOR VACUUM ASSEMBLING OF BUSHINGS

[75] Inventor: Jere L. Lowe, Logansport, Ind.

[73] Assignee: The General Tire & Rubber Company, Akron, Ohio

[22] Filed: May 16, 1973

[21] Appl. No.: 357,152

[52] U.S. Cl. ............. 29/149.5 NM, 29/451, 29/235
[51] Int. Cl. ............................................ B21d 53/10
[58] Field of Search ........... 29/450, 451, 149.5 NM, 29/235, 436

[56] References Cited
UNITED STATES PATENTS

| | | | |
|---|---|---|---|
| 1,830,814 | 11/1931 | Thiry | 29/149.5 NM |
| 2,361,783 | 10/1944 | McLaughlin | 29/235 UX |
| 2,696,443 | 12/1954 | Allbright | 29/451 UX |
| 2,877,543 | 3/1959 | Myers | 29/235 |
| 2,930,640 | 3/1960 | Davis et al. | 29/450 X |
| 3,588,979 | 6/1971 | Miller | 29/450 X |
| 3,694,894 | 10/1972 | Jelinek | 29/235 X |
| 3,786,553 | 1/1974 | Ma | 29/450 X |

Primary Examiner—Charlie T. Moon

[57] ABSTRACT

A method and apparatus for assembling articles, especially bushings, of the type having a generally cylindrical or oval elastomeric insert, a rigid outer sleeve, and a rigid inner core. The sleeve and the core are positioned within the fixture of the present invention and the bottom portion of the insert is located within the top portion of the outer sleeve. The positioning of the parts is such that the outer sleeve, the insert, the inner core, and the apparatus define an included chamber which is substantially air-tight. A vacuum is then applied to the enclosed chamber and the resulting suction on the bottom portion of the insert, together with any additional external force that may be required, cause the insert to move into assembled position, radially compressed, between the inner core and the outer sleeve.

9 Claims, 4 Drawing Figures

3,824,660

METHOD AND APPARATUS FOR VACUUM ASSEMBLING OF BUSHINGS

BACKGROUND OF THE INVENTION

1. Field of the Invention

The present invention relates to resilient bushings of the type in which a generally cylindrical or oval elastomeric insert is confined under radial pressure between an outer sleeve or "outer metal" and an inner core or "inner metal", and more particularly, this invention relates to a method and apparatus for assembling such bushings.

The resilient bushings to which the present invention relates have been widely and successfully employed in the automotive industry, where it is desirable to provide a flexible connection between two members, or isolate vibration therebetween, with one of the members attached to the inner core and the other member attached to the outer sleeve. The resilient bushing then permits the two members to rotate with respect to each other about a common axis, move axially with respect to each other, or combine the radial and axial movement.

2. Description of the Prior Art

Examples of the conventional bushing assembly art are illustrated in U.S. Pat. Nos. 2,877,543 and 3,588,979 (both assigned to the present assignee). The U.S. Pat. No. 2,877,543 discloses the method and apparatus for assembling resilient bushings in which the outer sleeve and the insert are positioned within vertically movable crossheads, and the inner core is located on a vertically movable mandrel. The crossheads come together forcing the insert into the outer sleeve, and subsequently, the mandrel raises the inner core, forcing it into the insert.

Initially, resilient bushings tended to be relatively simple in configuration, but as the art advanced, the range of materials and the variety of configurations increased. Many of the bushings of more recent design have utilized lower durometer materials or oppositely disposed voids to give the bushing a variable spring rate. Both of the aforementioned design modifications tend to decrease the longitudinal rigidity of the bushing insert, thereby making it more difficult to assemble the bushing by forcing the insert, thereby making it more difficult to assemble the bushing by forcing the insert into the outer sleeve, then forcing the inner core into the insert.

The assembly of the more conventionally shaped bushings has been aided by the use of lubricants, including petroleum oil or mineral oil, or a thin film of a gas, such as air, as disclosed in the U.S. Pat. No. 3,588,979. Despite such advances in the art generally, no satisfactory solution has been found for the assembly of bushings employing the lower durometer materials and more complicated configurations of insert, especially those which are voided.

SUMMARY OF THE INVENTION

Therefore, it is an object of the present invention to provide a method and apparatus which will facilitate the assembly of resilient bushings having inserts which are of a relatively low durometer material, or which have oppositely disposed voids and which tend to buckle or fold over when subjected to an axial force, as is applied during the conventional bushing assembly techniques.

It is also an object of the present invention to provide an apparatus and method for assembling resilient bushings which will eliminate the need for a large assembly press, capable of exerting relatively large forces.

It is a further object of the present invention to provide a method and apparatus for the assembly of resilient bushings which makes it possible to perform such an assembly operation without the need for electrical or hydraulic power, and requiring only some type of evacuating apparatus.

It is an additional object of the present invention to provide an apparatus for assembling resilient bushings which is adapted for use either manually or as part of an assembly press.

These and other objects of the present invention, which will become apparent upon a reading of the following detailed description, are accomplished by the provision of an apparatus comprising a base member having an upper face and including means for locating the rigid inner core, a mandrel to be located within the inner core, and having a tapered upper portion projecting above the core, an outer wall member extending from the base member generally normal to the upper face and adapted to locate the outer rigid sleeve generally concentric with the inner core, such that when the bottom portion of the insert is positioned within the top portion of the outer sleeve, the upper portion of the mandrel is in sealing engagement with the bore-defining inner surface of the insert, and the base member, outer wall member, the insert and the mandrel define an enclosed substantially air tight chamber. The apparatus further comprises a means for applying a vacuum to the enclosed chamber, and the base member defines at least one passageway for establishing open communication between the enclosed chamber and the vacuum-applying means.

In accordance with a further aspect of the present invention, prior to the application of a vacuum, the outer sleeve and the inner core are located, with respect to each other, in substantially the same spatial relationship as in the assembled bushing.

DESCRIPTION OF THE PREFERRED EMBODIMENTS

Figure 2:
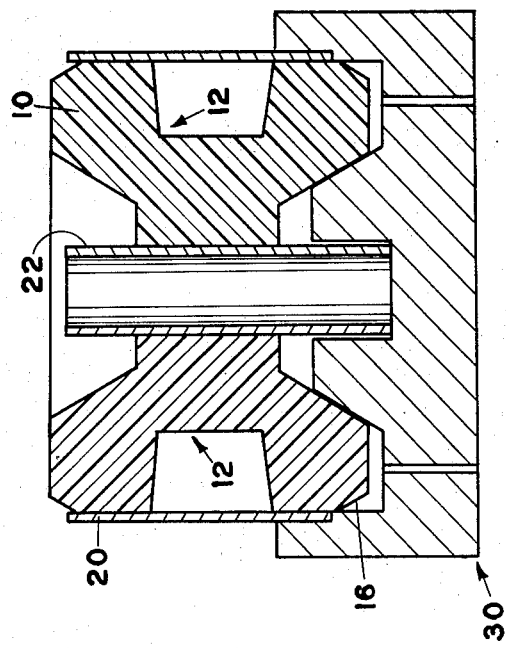
Figure 1:
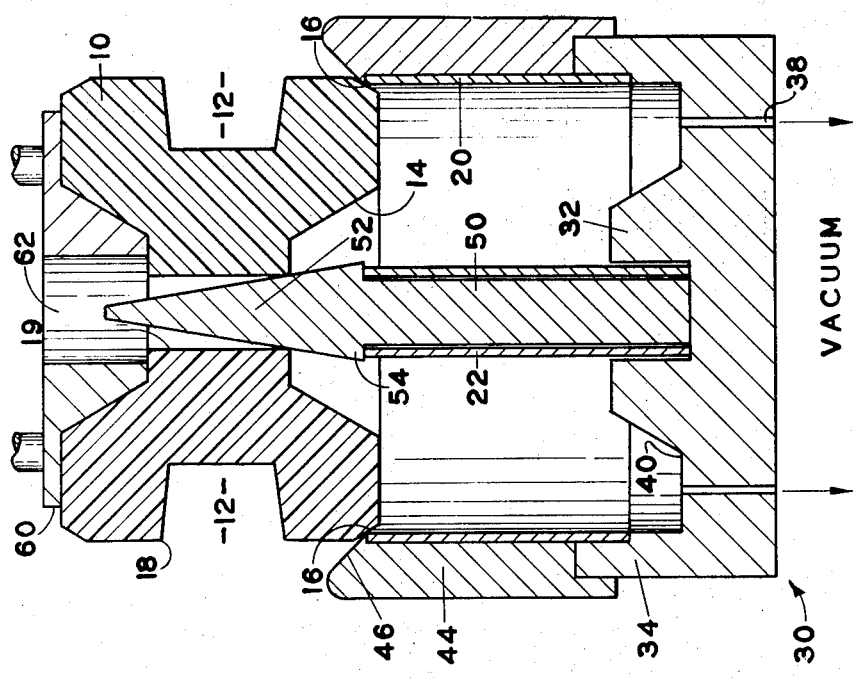

Referring specifically to the drawings which are for the purpose of illustrating preferred embodiments of the invention, and not for the purpose of limiting the same, FIG. 1 is a cross-sectional view illustrating the method and apparatus of the present invention. As was indicated previously, this invention may be used for the assembly of any product or device in which a resilient or elastomeric member is held under radial compression between an inner core and an outer sleeve, but it is especially useful for bushings where the resilient member is of relatively low durometer (e.g., 35 to 50 Shore A), or is voided. In the subject embodiment, the elastomeric insert 10 has a pair of oppositely disposed voids 12, a bottom surface 14 and a circumferential bottom taper 16. The outside dimensions of the insert are larger than the inside dimensions of the outer metal or sleeve 20, while the inside dimensions of the insert are less than the outside dimensions of the core or inner metal 22, thus providing an interference fit at both locations, and the resulting radial compression of the insert upon assembly. FIG. 1 illustrates the relative positions of the insert, core and sleeve prior to the assembly operation and FIG. 2 shows the assembled bushing, ready to be removed from the fixture.

The Vacuum Assembly Nest

Figure 3:
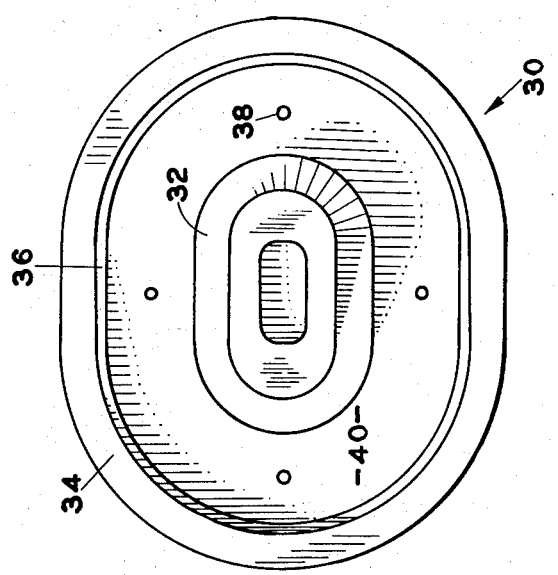

As is best shown in FIGS. 1 and 3, the vacuum assembly nest of the present invention comprises a base member 30 having a central raised portion 32 within which the core 22 can be located. The base member 30 further comprises an upstanding wall member 34, which is preferably integrally formed with the base member 30, having generally the same shape as the sleeve 20 and including an internal ledge 36 upon which the sleeve may be located in such a way as to provide a substantially airtight seal when the sleeve is forcibly held against the ledge 36. There are a plurality of air passages 38 in open communication between the upper face 40 of the base member 30 and an apparatus for pulling a vacuum (apparatus not shown).

In addition to the base member 30, a funnel 44 is provided, positioned closely about the sleeve 20, upon the top of wall member 34, and having an inwardly inclined face 46, projecting inwardly at least as far as the inside dimension of the sleeve. Although the circumferential taper 16 on the bottom of the insert 10 allows for the initial movement of the insert into the sleeve, there is typically no such taper on the corner at the top of the void 12, but rather a sharp corner 18, as shown in FIG. 1. Therefore, when the insert is far enough into the sleeve 20 that the corner is adjacent the top of the sleeve, rather than being hung-up on the top edge, the corner 18 will slide along inclined face 46 and down inside sleeve 20.

Similarly, to facilitate the positioning of the inside dimension of the insert over the core, a mandrel 50 may be provided, and positioned within the core 22, having approximately the same shape as the core, and terminating at its upper end in a taper 52, along which the corner formed by the bottom surface 14 and the inside surface 19 of the insert can slide, with the inside dimensions of the insert gradually increasing. At the lower end of the taper 52 is a skirt 54 which overhangs the top of the core 22 and extends outward beyond the outside dimensions of the core. Not only do the taper and funnel provide for easier entry of their respective mating parts into the assembly position, but they also help to prevent damage to the elastomeric insert which could be caused by roughness on the end of the core or sleeve.

Bushing inserts are most commonly made from any one of a number of natural rubber compounds and the core and sleeve may be made from aluminum, but are preferably cold-rolled steel. In regard to the apparatus of the present invention, the base member 30, mandrel 50 and funnel 44 may be molded, rigid plastic, but for economic production of small numbers of each part, they are preferably machined from tool steel, with certain surfaces, such as the surface of the taper 52, ground and polished to a smooth finish.

The Assembly Operation

In the operation of the vacuum assembly nest the parts of the bushing and of the apparatus are located as shown in FIG. 1, with the inwardly inclined surfaced 46 having the circumferential taper 16 resting thereon as shown. The sleeve 20, the bottom surface or portion 14 of the insert, the taper of the mandrel 50, and the base member 30 define an enclosed chamber to which a vacuum may be applied. Because the vacuum by itself may not provide sufficient force to assemble all bushings, FIG. 1 also includes a pusher 60 to provide any additional force required for the assembly. The pusher 60 may be a hand-held device or it may be part of an assembly press. The pusher 60 has a vertical bore 62 so that, as the insert 10 and the pusher 60 move down over the mandrel 50, the taper 52 projects into the bore 62, with no interference between the pusher and the taper.

For a bushing which is not made in large enough quantities to justify the automation of an assembly press, the pusher 60 may be replaced by the human hand in a bench-type operation. The combination of the vacuum applied to the enclosed chamber and the external force, if any is needed, forces the insert 10 down over the core 22 and within the sleeve 20 simultaneously to the finally assembled position as shown in FIG. 2, with the mandrel, funnel and pusher removed. In addition to the pusher, the insertion of the insert into the sleeve may be further aided by the use of a lubricant, such as a petroleum oil, as disclosed in U.S. Pat. No. 3,588,979, discussed above as part of the prior art.

It should be understood that the particular method of applying a vacuum to the enclosed chamber is not important to the inventive concept described herein, and the scope of the present invention is not to be construed as being limited to any particular vacuum pulling device or apparatus. The vacuum level is not especailly critical either, and for a particular bushing configuration and insert durometer, the optimum vacuum can easily be determined empirically. In general, however, the vacuum apparatus used should be capable of supplying a vacuum of at least about 20–25 inches of mercury, the vacuum level affecting the speed with which the insert is sucked into assembled position.

Figure 4:
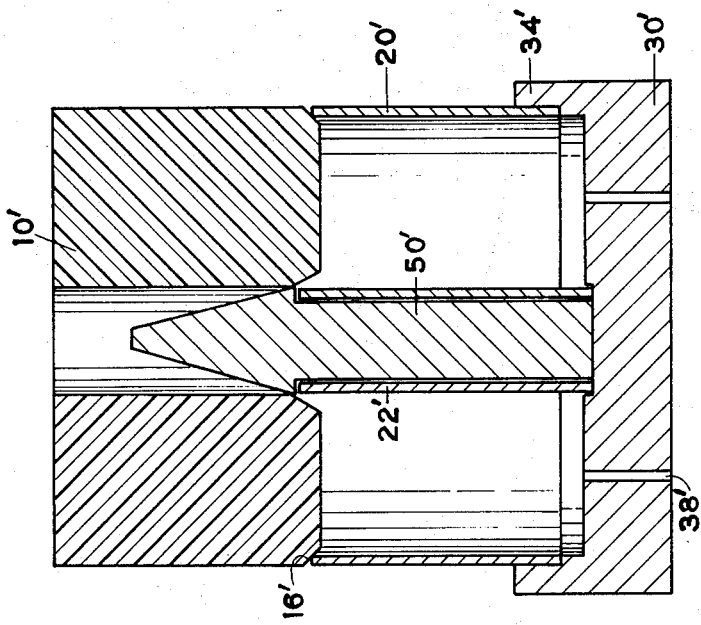

Nor is it intended that the scope of the present invention be limited to the use of the present apparatus in connection with any particular style or configuration of bushing or insert. Accordingly, FIG. 4 illustrates one of many possible alternative embodiments of the present invention, similar to FIG. 1, with similar parts being referenced by the same number, but with a prime, and with the funnel and pusher omitted. In FIG. 4, the bushing comprises an unvoided, straight, cylindrical insert 10', 9 cylindrical sleeve 20'and a cylindrical core 22'. While it has been stated previously that the present invention is of particular advantage when the bushing insert is of a relatively low durometer, it should be clearly understood that by applying the method of the present invention and equivalent apparatus to a conventional bushing assembly press, the force required to effect the assembly can be substantially reduced. On the other hand, when used manually without an assembly press, the method and apparatus of the present invention may make it economically feasible to produce a small quantity of special bushings with the assembly being merely a bench operation, or to produce a very large quantity of bushings without the necessity for additional assembly presses and the attendant expansion of plant and facilities, i.e., electric and hydraulic power.

The invention has been described in great detail sufficient to enable one of ordinary skill in the art to make and use the same. Obviously, modifications and alterations of the preferred embodiments will occur to others upon a reading and understanding of the specification and it is my intention to include all such modifications and alterations as part of my invention insofar as they come within the scope of the appended claims.

What is claimed is:

1. Apparatus especially suited for assembling resilient bushings including an elastomeric, rubbery insert having a bottom portion and a surface defining a bore generally perpendicular to said bottom portion, said insert retained under radial compression between a rigid outer sleeve having a top portion and a rigid inner core, said apparatus comprising:
   a. a base member having an upper face and including means for locating the inner core;
   b. a mandrel to be located within the inner core, and having a tapered upper portion projecting above the core;
   c. said base member including an outer wall member extending from said base member generally normal to said upper face and adapted to locate the outer sleeve generally concentric with the inner core, such that when the bottom portion of the insert is positioned within the top portion of the outer sleeve, said upper portion of said mandrel is in sealing engagement with the bore-defining surface of the insert, and said base member, said outer wall member, the insert and said mandrel define an enclosed, substantially airtight chamber;
   d. means for applying a vacuum to said chamber; and
   e. said base member defining at least one passageway for establishing open communication between said chamber and said vacuum-applying means.

2. The apparatus of claim 1 including a funnel member adapted to be positioned in a closely spaced relationship about the rigid outer sleeve, said funnel member terminating at its upper end in an inwardly inclined surface about its entire circumference, said surface extending radially inwardly to terminate, at its lower end, in an edge, said edge being in a spaced, generally uniform relationship with, and inwardly of, the upper, inner edge of said sleeve.

3. The apparatus of claim 1 wherein said base member and said outer wall member are integrally formed.

4. The apparatus of claim 1 including a member adapted to contact the insert and transmit a downwardly-directed force thereto, said member defining a bore having its axis generally perpendicular to the axis of said mandrel, the dimensions of said bore being greater than the dimensions of the largest cross-section of said mandrel, taken perpendicular to the axis of said mandrel.

5. The apparatus of claim 1 wherein said vacuum-applying means is capable of effecting a vacuum of at least about 20 inches of mercury.

6. A method for assembling an article including an elastomeric, rubbery insert having a bottom portion and a surface defining a bore generally perpendicular to said bottom portion, said insert retained under radial compression between a rigid outer sleeve having a top portion, and a rigid inner core, said method comprising:
   a. providing an apparatus having a base member including locating means for the inner core and an outer wall member extending from said base member and adapted to locate the outer sleeve such that the sleeve and the core are in substantially the same spatial relationship as in the assembled bushing;
   b. locating the sleeve and the core;
   c. positioning the bottom portion of the insert within the top portion of the outer sleeve;
   d. sealing the space between the bore-defining surface and the inner core, said insert, the core, said base member, and the sleeve thereby defining an enclosed, substantially airtight chamber; and
   e. applying a vacuum to said chamber.

7. The method of claim 6 including the step of applying sufficient additional downward pressure to said insert to force said insert into position, radially compressed between said sleeve and said core.

8. The method of claim 6 including the step of applying a lubricant to the inner surface of said outer sleeve, prior to applying a vacuum to said chamber.

9. The method of claim 6 including the step of applying a lubricant to the surfaces of said insert to be in contact with the inner surface of said outer sleeve, said step to be performed prior to applying a vacuum to said chamber.

* * * * *